Figure 1:
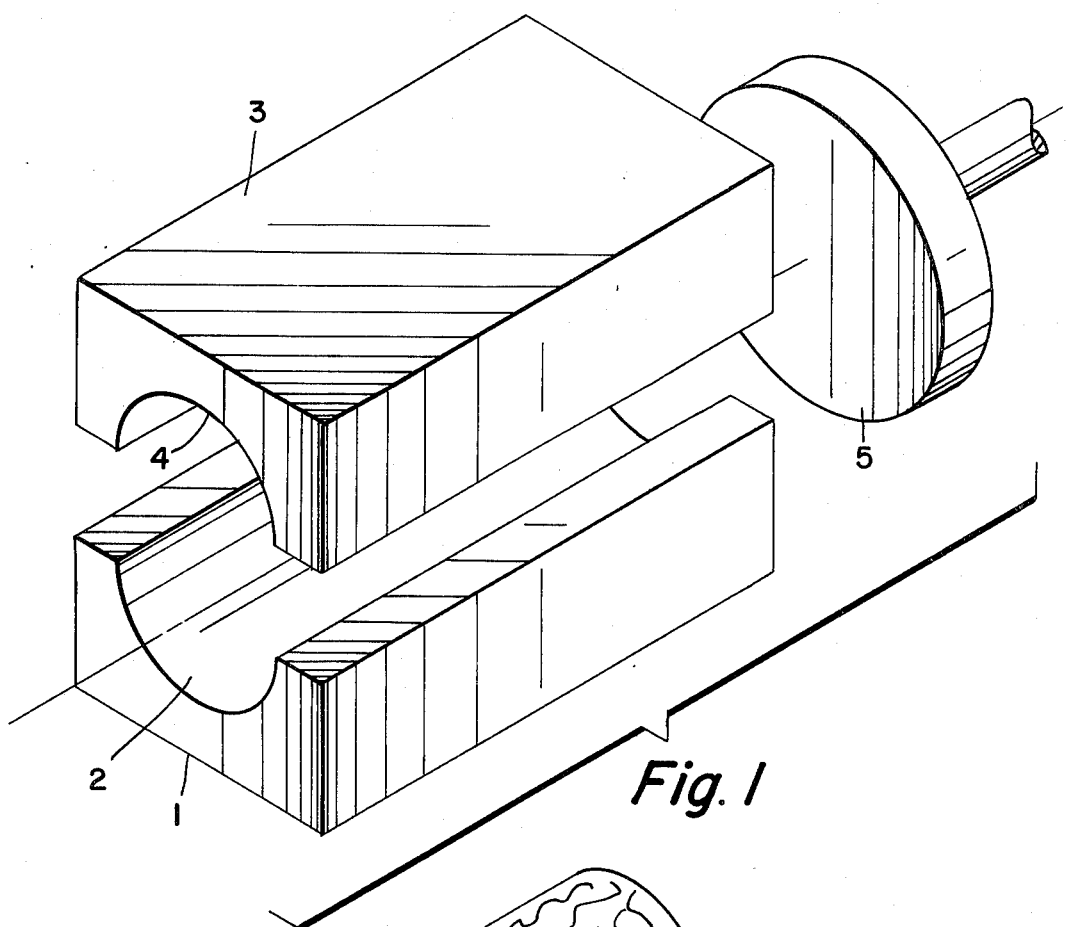

United States Patent [19]

Mart

[11] 4,072,763
[45] Feb. 7, 1978

[54] MEAT PRODUCT AND METHOD OF MAKING SAME

[76] Inventor: Clyde Mart, 24900 Duffield Road, Beachwood, Ohio 44122

[21] Appl. No.: 724,567

[22] Filed: Sept. 20, 1976

[51] Int. Cl.² ............................................... A23J 3/00
[52] U.S. Cl. ..................................... 426/513; 426/92; 426/657; 426/518; 426/524
[58] Field of Search ................ 426/92, 100, 272, 657, 426/512, 513, 518, 524

[56] References Cited

U.S. PATENT DOCUMENTS

| | | | |
|---|---|---|---|
| 2,527,493 | 10/1950 | Condon | 426/524 |
| 2,812,260 | 11/1957 | Keane et al. | 426/513 |
| 2,823,127 | 2/1958 | Gwilliam et al. | 426/513 X |

*Primary Examiner*—R. B. Penland
*Attorney, Agent, or Firm*—Isler and Ornstein

[57] ABSTRACT

A meat product is disclosed, comprising a flat or planar cut of predetermined peripheral shape or contour and thickness, and consisting of thin slices of meat which have been compressed in a meat press or dies to form a layered structure, in which the layers extend substantially perpendicular to the plane of the flat cut. The cuts are made by a method in which chucks, such as beef chucks, are placed in trays, upon or in adjacent relation to each other with the chucks preferably extending in the direction of the grain of the meat and frozen into a substantially solid mass, the frozen chucks tempered at a temperature slightly below the freezing point, and sawed or otherwise cut into elongated blocks of somewhat irregular shape or contour, the cutting being effected along lines which are parallel or substantially parallel with the grain of the meat. The tempered blocks are placed in a slicing machine, in which they are rapidly sliced to a thickness of from about 1/40 inch to about 1/20 inch, the slicing being against the grain of the meat, that is, substantially perpendicular to the grain. The thin slices are then placed in a meat press, and compressed by the dies of the press to form a "log" consisting of slices of meat which are flattened or stacked or compressed upon one another and lie lengthwise or longitudinally of the dies, with the grain of the meat extending perpendicularly to the axis of the dies, and thus, perpendicularly to the axis of the log. The logs are then cut into cuts of the meat product, or steaks, consisting of strips which extend perpendicular to the plane of the cut, instead of layers of meat which are parallel to the plane of the steak.

6 Claims, 3 Drawing Figures

U.S. Patent  Feb. 7, 1978  4,072,763

MEAT PRODUCT AND METHOD OF MAKING SAME

This invention relates, as indicated, to a meat product and to a method of making the same.

A primary object of the invention is to make or prepare a meat product, of the nature or appearance of steaks, but made of thin slices of beef or the like.

Another object of the invention is to make or prepare a meat product of the character described, which is substantially free of fat and gristle, and entirely free of bone and additives of any kind.

A further object of the invention is to provide a meat product of the character described, made by a method or process in which thin slices of beef are placed or packed in random directions or planes in a press and formed by the press into a "log" or elongated rod or bar, in which the slices overlie each other in substantially concentric relationship with each other, irrespective of the fact that the slices were placed or packed randomly in the die of the press.

A still further object of the invention is to provide a meat product of the character described, consisting of strips of meat disposed perpendicularly to the plane of the product, rather than layers of meat, whereby to facilitate and speed up the time of cooking of the product.

Other objects and advantages of my invention will be apparent during the course of the following description.

Figure 2:
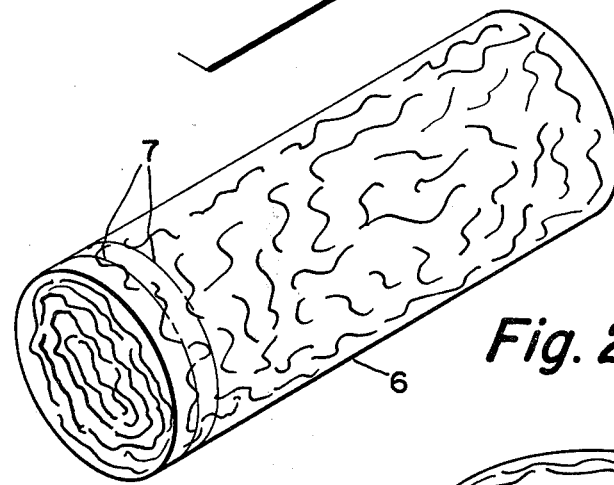
Figure 3:
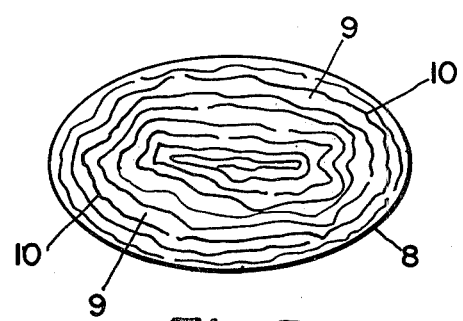

In the accompanying drawings forming a part of this specification, and in which like numerals are employed to designate like parts throughout the same, FIG. 1 is an exploded perspective view, showing dies and a plunger of a meat press utilized in forming a "log," from which slices of the meat product are cut;

FIG. 2 is a perspective view of the "log" formed by the dies and plunger shown in FIG. 1, and from which "log," slices of the meat product are cut, and FIG. 3 is a top plan view of the meat product or cut.

In accordance with the invention, fresh boneless beef chucks, averaging about 80 pounds each, are defatted, degristled, and made free of all discolorations and blood clots.

A chuck may be defined as the portion of a side of dressed beef including the neck, the parts about the shoulder blade and those about the first three ribs, but may also be defined as a similar cut from a carcass of dressed veal or lamb.

The beef chucks thus prepared, are placed on trays upon or in adjacent relation to each other, with the chucks preferably extending in the direction of the grain of the meat, and frozen into a solid block or mass at a temperature of from about 0° F. to about 10° F.

The frozen chucks are then tempered to a temperature of from about 25° F. to about 27° F., by placing them in a tempering room of such temperature or by using micro wave ovens which have been developed to temper meat.

The beef chucks thus tempered are sawed or otherwise cut into elongated blocks of somewhat irregular shape or contour, approximately 6 inches × 6 inches × 20 inches, the cutting being effected along lines which are parallel or substantially parallel with the grain of the meat.

The tempered blocks are then placed in a slicing machine, in which they are rapidly sliced to a thickness of from about 1/40 inch to about 1/20 inch, the slicing being against the grain of the meat, that is to say, substantially perpendicular to the grain of the meat. The slices fall into and are accumulated in a bin or other receptacle or container.

It may be noted, at this point, that the slices fall into the bin and form a pile or mass in which the individual slices lie in planes which are randomly related or oriented to the planes of the other slices, a condition which may be described as random orientation of the slices.

The bin containing the slices of beef is then moved to a Bettcher press or similar machine, in which a stationary die and a movable die are mounted, as well as a hydraulically-actuated plunger, which is aligned axially with the axis of the stationary die.

In FIG. 1 of the drawings, such a stationary die 1 having a substantially semi-cylindrical or semi-oval shaped surface 2 is diagrammatically illustrated, along with a movable die 3 having a substantially semi-cylindrical or semi-oval shaped surface 4, and a plunger 5, which is aligned axially with the axis of the surface 2 of the die 1.

The die 1 is filled to capacity with the tempered slices of meat taken from the bin, to which reference has been made. The movable die 3 is then moved downwardly toward the stationary die 1, and, at the same time, the plunger 5 is moved toward the dies 1 and 3. In this manner, a "log" 6, as seen in FIG. 2, is formed by the compressive action of the dies 1 and 3 and a plunger 5. In this forming of the log, the slices of meat are flattened or stacked or compressed upon one another and lie lengthwise or longitudinally in the dies, although not necessarily in concentric relationship with each other. The grain of the meat, however, extends perpendicularly to the axis of the of the dies, and, thus, perpendicularly to the axis of the log.

The dimensions of the log may vary depending on the diameter of the die surfaces and length of the dies, an illustrative example being a log about 3 inches in diameter and about 18 inches in length.

An important feature of the invention resides in the fact that although the slices of tempered beef are placed or packed into the dies in the random orientation to which reference has been made above, the slices when compressed to form the log 6, are not folded or distorted or broken into fragments, but are flattened or stacked or compressed upon one another and extend lengthwise or longitudinally in the dies, with the grain of the meat extending perpendicularly to the axis of the dies, and thus, perpendicularly to the axis of the log.

The reasons for this are somewhat difficult to explain, but it may be attributed, in part, at least, to the fact that the tempered slices, although cold, retain sufficient flexibility to enable them to be compressed into the desired layered arrangement and orientation, instead of being folded or distorted or broken into fragments. It may also be attributed, in part, to the fact that the movable die 3 is moved at a relatively slow speed.

The formation of logs of uniform diameter or dimensions from end to end, facilitates portion control slicing of the logs, by slicing the logs into portions of uniform thickness by a slicing action which is perpendicular to the axis of the log, as indicated by the broken lines 7 in FIG. 2. These portions provide a steak or steakette consisting of strips of metal which extend perpendicularly to the plane of the portion, instead of layers of meat which are parallel to the plane of the portion, as found in conventional steaks of this type. The thickness of the portions may be varied, depending on the preference of the eater.

In FIG. 3, a steak or steakette 8, cut from the log 6, along the line 7, is shown in plan view. In this instance, the steak is of oval-shaped contour and the slices or strips constituting the steak extend at right angle to the plane of the cut, that is to say, the grain of the meat is perpendicular to the axis of the cut.

The portions, as thus sliced from the log, may be packaged for the freezer, and maintained frozen until ready for use.

Cooking of the portions on the grill or in a frying pan is greatly facilitated or speeded up by reason of the fact that the heat rises vertically through the interstices or spaces 10 (see FIG. 3) between the strips 9 comprising the steak, as compared with a steak of this type consisting of layers parallel with the plane of the steak, in the cooking of which the layers impede the flow of heat.

The shape or contour of the steak may be varied by utilizing dies of different shape or contour in the meat press.

Although the invention has been described particularly with reference to beef chucks, it will be understood that cuts other than chucks may be utilized in the method or process, and that the method or process is applicable to meat products other than beef, as, for example, pork, veal and lamb.

It will be further understood that slight changes may be made in the method or process which has been described, without departing from the spirit of the invention or the scope of the appended claims.

Having thus described my invention, I claim:

1. A meat product consisting of a flat or planar cut of predetermined thickness and peripheral contour, consisting of thin slices of meat, arranged in a layered structure, in which the layers of the meat extend substantially perpendicular to the flat plane of the cut, and are disposed substantially concentrically about the center or axis of the cut, with the grain of the slices of meat extending along lines substantially perpendicularly to the center or axis of the cut.

2. A meat product, as defined in claim 1, wherein the thin slices of meat are arranged about an axis which is the axis of the cut.

3. The method of preparing a meat product, said method comprising the steps of arranging beef chucks upon or in adjacent relation to each other, with the chucks extending substantially in the direction of the grain of the meat, freezing the chucks into a solid block or mass, at a temperature of from about 0° F. to about 10° F., tempering the mass at a temperature of from about 25° F. to about 27° F., cutting the mass into elongated blocks, the cutting being effected along lines which are parallel or substantially parallel with the grain of the meat, slicing the tempered blocks into thin slices by slicing against or perpendicular to the grain of the meat, collecting the slices in a bin or like receptacle, in randomly oriented relationship, placing the randomly oriented slices in a meat press and compressing them into elongated logs consisting of thin slices of meat, arranged in a layered structure in which the layers of the meat are flattened, stacked or compressed upon each other and lie lengthwise or longitudinally of the logs and are disposed substantially concentrically about the center or axis of the log, with the grain of the meat extending along lines substantially perpendicularly to the center or axis of the log.

4. The method, as defined in claim 3, wherein the logs are cut into flat portions by a cutting action which is perpendicular to the axis of the logs.

5. The method, as defined in claim 3, wherein the blocks are cut into thin slices of a thickness of from about 1/40 inch to about 1/20 inch.

6. The method of preparing a meat product, said method comprising the steps of arranging beef chucks upon or in adjacent relation to each other, with the chucks extending substantially in the direction of the grain of the meat, freezing the chucks into a solid block or mass, tempering the mass, cutting the mass into elongated blocks, the cutting being effected along lines which are parallel or substantially parallel with the grain of the meat, slicing the tempered blocks into thin slices by slicing against or perpendicular to the grain of the meat, collecting the slices in a bin or like receptacle, in randomly oriented relationship, placing the randomly oriented slices in a meat press and compressing them into elongated logs consisting of thin slices of meat arranged in a layered structure in which the layers of the meat are flattened, stacked or compressed upon each other and lie lengthwise or longitudinally of the logs, and are disposed substantially concentrically about the center or axis of the logs, with the grain of the meat extending along lines substantially perpendicular to the center or axis of the logs, and cutting the logs into flat cuts or portions by a cutting action which is perpendicular to the axis of the logs.

* * * * *